US009501566B1

(12) United States Patent
Wiggins et al.

(10) Patent No.: US 9,501,566 B1
(45) Date of Patent: Nov. 22, 2016

(54) USER INTERFACE FOR TRANSPARENT CONCEPT SEARCH

(75) Inventors: Nelson Murray Wiggins, San Jose, CA (US); Chitrang Shah, San Carlos, CA (US); Gary Steven Lehrman, Cupertino, CA (US); Kurt Leafstrand, Saratoga, CA (US)

(73) Assignee: Veritas Technologies LLC, Mountain View, CA (US)

( * ) Notice: Subject to any disclaimer, the term of this patent is extended or adjusted under 35 U.S.C. 154(b) by 259 days.

(21) Appl. No.: 13/351,992

(22) Filed: Jan. 17, 2012

(51) Int. Cl.
  *G06F 7/00* (2006.01)
  *G06F 17/30* (2006.01)

(52) U.S. Cl.
  CPC ............... *G06F 17/30731* (2013.01)

(58) Field of Classification Search
  CPC ............ G06F 17/3064; G06F 17/30731; G06F 17/30646
  USPC ............ 707/706, 736, 767, 737, 758
  See application file for complete search history.

(56) References Cited

U.S. PATENT DOCUMENTS

| | | | |
|---|---|---|---|
| 5,598,557 A | 1/1997 | Doner et al. | |
| 6,457,026 B1 * | 9/2002 | Graham | G06F 17/30017 707/999.003 |
| 6,671,683 B2 | 12/2003 | Kanno | |
| 7,461,059 B2 * | 12/2008 | Richardson et al. | |
| 7,743,051 B1 | 6/2010 | Kashyap et al. | |
| 7,752,243 B2 * | 7/2010 | Hoeber et al. | ......... 707/765 |
| 8,392,409 B1 | 3/2013 | Kashyap et al. | |
| 2004/0199555 A1 | 10/2004 | Krachman | |
| 2005/0246328 A1 | 11/2005 | Zhang et al. | |
| 2008/0140649 A1 * | 6/2008 | Williams | .......... 707/5 |
| 2010/0030798 A1 | 2/2010 | Kumar et al. | |
| 2011/0113042 A1 | 5/2011 | Green et al. | |
| 2011/0225155 A1 * | 9/2011 | Roulland et al. | ......... 707/737 |
| 2011/0320453 A1 | 12/2011 | Gallivan et al. | |
| 2012/0158728 A1 | 6/2012 | Kumar et al. | |
| 2013/0013612 A1 | 1/2013 | Fittges et al. | |

OTHER PUBLICATIONS

U.S. Appl. No. 13/474,602, filed May 17, 2012.
U.S. Appl. No. 13/324,903, filed Dec. 13, 2011.
U.S. Appl. No. 13/335,809, filed Dec. 22, 2011.
U.S. Appl. No. 13/335,809, User Interface for Finding Similar Documents, filed Dec. 22, 2011.

* cited by examiner

*Primary Examiner* — Md. I Uddin
(74) *Attorney, Agent, or Firm* — Wilmer Cutler Pickering Hale and Dorr LLP

(57) ABSTRACT

A computing device identifies concept terms related to an input phrase based on data in a data set. The input phrase defines an initial scope of a concept search. The computing device presents the concept terms in a graphical user interface (GUI) and a GUI element in the GUI to represent the input phrase. Upon a selection of at least one concept term, the computing device presents a visual representation of a relationship between the selected concept term(s) and the input phrase in the GUI using the GUI element, and a count of documents available to be retrieved in the GUI based on the relationship.

17 Claims, 7 Drawing Sheets

USER INTERFACE FOR TRANSPARENT CONCEPT SEARCH

TECHNICAL FIELD

Embodiments of the present invention relate to searching data, and more particularly, to a technique of providing a user interface for transparent concept search.

BACKGROUND

Reviewers that review data sets, for example, during electronic discovery (e-discovery), may encounter data sets that contain thousands of documents. The reviewers may not need to review all of the documents and may conduct a concept search of a data set to identify which documents are relevant for review. A concept search (or conceptual search) is an information retrieval method that is used to search electronically stored unstructured text (e.g., digital archives, email, etc.) for information that is conceptually similar to the information provided in a search query. In contrast, a key word search retrieves documents that contain the terms provided in a search query. In a concept search, the ideas expressed in the information retrieved are relevant to the ideas contained in the text of the concept search query. For example, a reviewer may wish to identify documents based on a search term "diamond." The data set may include documents that describe baseball fields, but do not contain the word diamond itself. A key word search would not likely return any of these documents. However, a concept search would include the documents that describe baseball fields as part of the concept search results. The concept search results, however, may be over-inclusive and include documents that are not relevant to a user's interests. For example, a user may be interested in diamond in the context of baseball, but the concept search may also return documents that pertain to diamond jewelry, diamond shapes, etc. Traditional concept search tools do not offer a way to refine the concept search criteria to return results that are more relevant.

SUMMARY

An exemplary system may include a memory and a processing device that is coupled to the memory. In one embodiment, the system identifies concept terms that are related to an input phrase based on data in a data set. The input phrase defines an initial scope of a concept search. The system presents the concept terms and a GUI element to represent the input phrase in a graphical user interface (GUI). Upon a selection of at least one concept term, the system presents a visual representation of a relationship between the selected concept term(s) and the input phrase in the GUI using the GUI element. The system presents a count of the documents that are available to be retrieved based on the relationship.

In one embodiment, upon a next selection of at least one concept term in the GUI, the system updates the visual representation to add a relationship between the next selection and the input phrase. The system updates the count of documents based on the relationship between the next selection and the input phrase.

In one embodiment, the system identifies the concept terms that are related to an input phrase by using a statistical co-occurrence algorithm or a thesaurus. In one embodiment, the system executes the concept search of the data set to locate the documents based on the selected concept term(s) and the input phrase and provides the documents to a user. In one embodiment, the system executes a key word search of the data set based on the input phrase and the selected concept term(s). In one embodiment, the system receives input of search criteria and executes a search of the data set to locate the documents based on the search criteria, the input phrase, and the selected concept term(s). In one embodiment, the search criteria includes a date range, custodian, location of data, data type, language, tag in folder, and/or property of a data.

In additional embodiments, methods for performing the operations of the above described embodiments are also implemented. Additionally, in embodiments of the present invention, a non-transitory computer readable storage medium stores methods for performing the operations of the above described embodiments.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
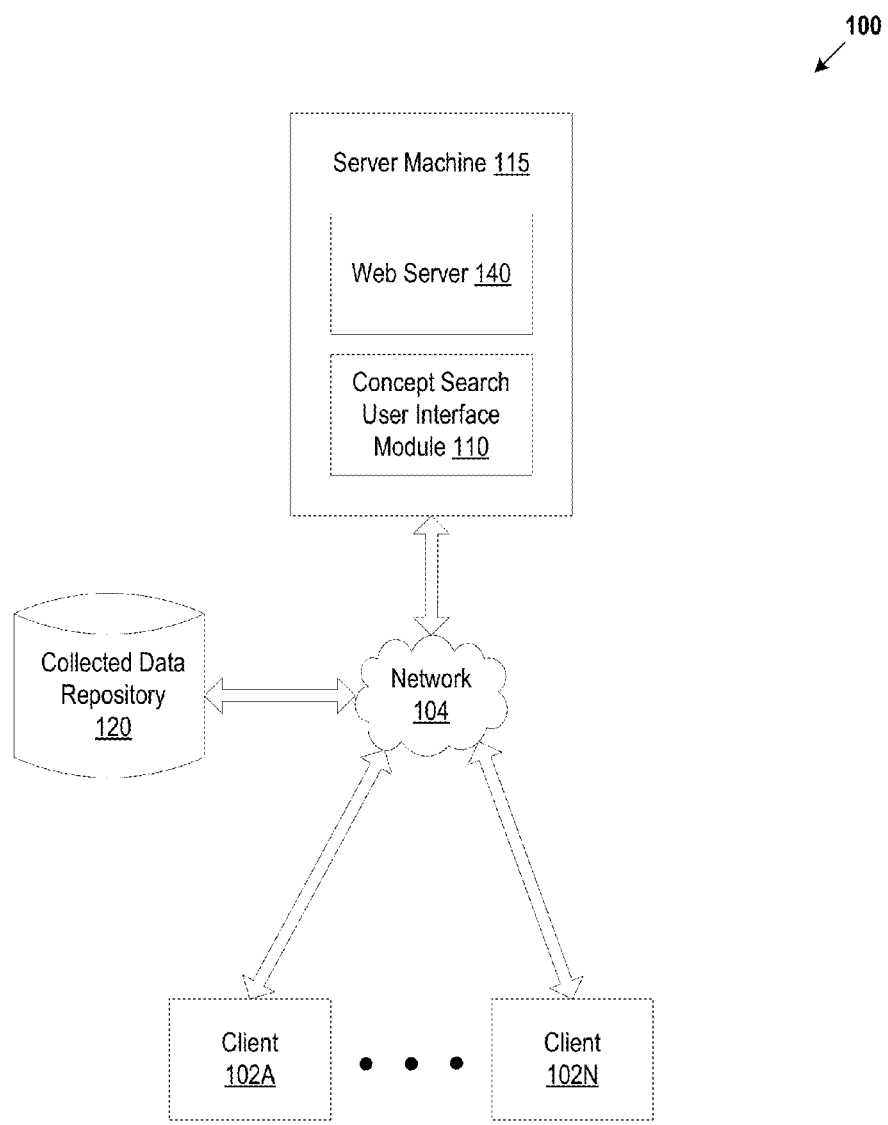
FIG. 1 illustrates exemplary system architecture, in accordance with various embodiments of the present invention.

Embodiments of the invention are directed to a method and system for providing a user interface for transparent concept search. A user that is conducting a review of a data set, for example, for electronic discovery (e-discovery), may wish to identify which of the documents in the data set are relevant for review. The user may use a graphical user interface (GUI) to conduct a search, such as a concept search (conceptual search), of the data set based on a search input phrase. An input phrase can be one or more words. For example, a user may be conducting e-discovery relating to a company "Diamond Investments, Inc." The user may enter input phrase "diamond" in the GUI to define an initial scope of a concept search. A computing device can identify concept terms related to an input phrase (e.g., diamond) based on data in the data set. The computing device presents the concept terms in the GUI. For example, the GUI may present a list of concept terms that describe how the term "diamond" is being used in the data set. For example, the list of concept terms may include carbon, poker, precious, earnings, field, investments, solitaire, argyle, profits, baseball, expectations, etc.

A user may select one or more of the concept terms in the GUI to refine the concept search in order to produce more relevant search results. For example, the user selects earnings, profits, expectations, and investments. Upon a selection of at least one concept term, the computing device presents a visual representation of a relationship between the selected concept term(s) and the input phrase (e.g., diamond) in the GUI, and a count of documents available to be retrieved in the GUI based on the relationship. For example, a GUI element providing a graphical representation of diamond may be connected via a line to a text element for each selected concept term to illustrate a parent-child relationship between the input phrase and the selected concept terms. The GUI may also indicate that 750 documents in the data set are relevant for review if a concept search is executed using the terms diamond, earnings, profits, expectations, and investments. Thus, other documents in the data set that relate to, for example, diamond jewelry, diamond shapes, diamond cards, etc., are filtered out from the concept search.

Embodiments provide users with transparent visibility into the terms which influence the concept search. Embodiments provide users the ability learn about the data set (e.g., documents) and identify terms the user may not have considered otherwise, such as code words or acronyms. For example, documents may include a certain expression, such as, "the eagle has landed," which appears next to the term "earnings" in the documents. A user working with the concept "earnings" may determine via some embodiments that the expression "the eagle has landed" are code words that are relevant to the term earnings. Embodiments also provide users with more relevant concept search results to help expedite a review session.

FIG. 1 illustrates exemplary system architecture 100 in which embodiments can be implemented. The system architecture 100 includes a server machine 115, a collected data repository 120, and client machines 102A-102N connected to a network 104. Network 104 may be a public network (e.g., the Internet), a private network (e.g., a local area network (LAN) or wide area network (WAN)), or a combination thereof.

Collected data repository 120 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. As will be appreciated by those skilled in the art, in some embodiments collected data repository 120 might be a network-attached file server, while in other embodiments collected data repository 120 might be some other type of persistent storage such as an object-oriented database, a relational database, and so forth.

The data in the collected data repository 120 can include data items. Examples of data items can include, and are not limited to, email messages, instant messages, text messages, voicemail messages, documents, database content, CAD/CAM files, web sites, loose files, archives, PST (personal storage table) files, container files, zip files, and any other electronically stored information that can be used for e-discovery. For brevity and simplicity, a document is used as an example of a data item in the collected data repository 120 throughout this document.

The client machines 102A-102N may be personal computers (PC), laptops, mobile phones, tablet computers, or any other computing devices. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may issue data search queries to the web server or may browse collected data that have previously been processed (e.g., indexed, classified, ranked). The client machines 102A-102N may also upload collected data to the web server for storage and/or classification.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, server machine 115 is deployed as a network appliance (e.g., a network router, hub, or managed switch). Server machine 115 includes a web server 140 and a concept search user interface module 110. In alternative embodiments, the web server 140 and concept search user interface module 110 may run on different machines.

Web server 140 may serve data from collected data repository 120 to clients 102A-102N. Web server 140 may receive data queries and perform searches (e.g., concept search, keyword search) on documents in the collected data repository 120 to find documents that satisfy the data query. A data query may be, for example, an e-discovery query based on parameters that can include, and are not limited to, concept search terms, keyword, date range, custodian, location of data, data type, languages, tags in folders, properties of a data item (e.g., email properties), etc. Web server 140 may then send to a client 102A-102N those documents that satisfy the search query. In one embodiment, web server 140 provides an application that manages the documents. For example, the application can be a document review application for e-discovery. In one embodiment, an application is provided by and maintained within a service provider environment and provides services relating to the collected data. For example, a service provider maintains web servers 140 to provide document review services for e-discovery.

The documents in the collected data repository 120 can be pre-processed to index and cross-reference the terms in the documents with each other. The terms can be assigned a relevance score that indicates a degree of relevance of the corresponding term to a concept. In one embodiment a statistical co-occurrence algorithm is used to assign a relevance score to each cross-reference of terms in the collected data repository 120. In another embodiment, a thesaurus is used to assign a relevance score to each cross-reference of terms in the collected data repository 120. A low relevance score can indicate that a term is not very relevant to the concept. A high relevance score can indicate that a term is very relevant to the concept. For example, the cross-reference of the term "carbon" to the concept defined by the input phrase "diamond" is assigned a relevance score of 0.986. The cross-reference of the term "earnings" to the concept "diamond" is assigned a relevance score of 0.983. The cross-reference of the term "ring" to the concept "diamond" is assigned a relevance score of 0.970.

A concept search user interface module 110 can use the relevance scores assigned to the cross-reference of terms in the collected data repository 120 to provide a visual representation of how a concept, as defined by an input phrase (e.g., diamond) and/or selected concept terms, is being used in the documents in the collected data repository 120. The concept search user interface module 110 can present the concept terms which are relevant to the concept, for example, based on the relevance scores, in a GUI. Upon a selection of at least one concept term, the concept search user interface module 110 can update the visual representation to reflect the relationship of the selected concept term(s) and the concept. A web server 140 can access the visual representation to provide a service related to the documents, such as a document review service. A user can use the terms, relationship, and number of documents presented in the GUI to decide how to define the scope of a concept search without having to execute the concept search.

Figure 2:
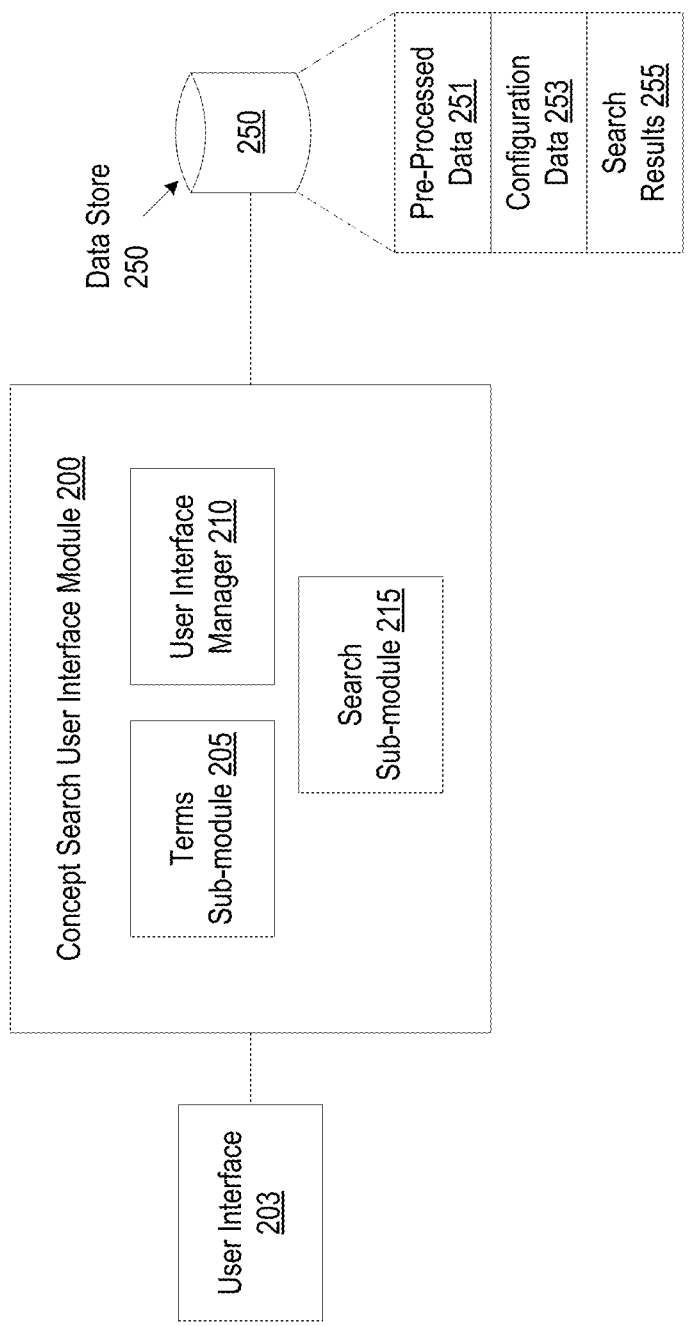
FIG. 2 is a block diagram of a concept search user interface module, in accordance with an embodiment.

FIG. 2 is a block diagram of a concept search user interface module 200, in accordance with one embodiment of the present invention. The concept search user interface module 200 includes a terms sub-module 205, a user interface (UI) manager 210, and a search sub-module 215. Note that in alternative embodiments, the functionality of one or more of the terms sub-module 205, the UI manager 210, and the search sub-module 215 may be combined or divided.

The UI manager 210 can generate and provide a user interface (UI) 203 to receive user input of a phrase that defines an initial scope of a concept search. The UI 203 can be a graphical user interface (GUI). The input phrase can be one or more words. For example, the input phrase can be one word, multiple words, a paragraph of words, a page of words, etc.

The terms sub-module 205 can identify concept terms that are related to the input phrase using pre-processed data 251 that is stored in a data store 250 that is coupled to the terms sub-module 205. The pre-processed data 251 includes concept terms that are cross-referenced to each other and an assigned relevance score for each term for each cross-reference. A relevance score indicates a degree of relevance of the corresponding concept term to a concept based on the documents in a data set. For example, a data set for e-discovery includes electronic documents (e.g., emails of employees, financial records, press releases, etc.) relating to a particular investigation. The terms in the documents for the particular investigation are cross-referenced to each other and assigned a relevance score. In one embodiment the relevance scores are in a range of 0-100. In another embodiment the relevance scores are in a range of 0-1.

In one embodiment, a pre-processing module is coupled to the sub-module 205 to pre-process data to determine the relevance scores. In another embodiment, the terms sub-module can pre-process data to determine the relevance scores. The pre-processed data 251 can be stored as one or more relational databases, spreadsheets, flat files, etc. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

In one embodiment, the relevance score for a cross-reference of terms is based on a statistical co-occurrence algorithm. A statistical co-occurrence algorithm can use proximity to determine a relevance score. A particular term can be located in a document and the other terms which are in proximity to the particular term are identified. Proximity may be defined by a number of terms. For example, a term may be within proximity of 10 terms of the particular term. The relevance score can also be based on the number of times a particular term and another term appear in different or same proximity in the documents.

In another embodiment, the relevance score for a cross-reference of terms is based on a thesaurus. A thesaurus may be a standard thesaurus and/or a concept thesaurus. The relevance score can be based on the thesaurus and the documents in the data set. For example, the thesaurus can be used to assign an initial relevance score to a cross-reference of a particular term and a synonym, and the initial relevance score can be modified based the number of times the particular term and synonym appear in different or same proximity in the documents.

A particular term can be located in the thesaurus and the terms that are associated with the particular term, as defined by the thesaurus, are each assigned a relevance score. In one embodiment, more than one thesaurus is used to determine a relevance score for a cross-reference of terms. The relevance score can be based on the order in which the thesaurus associates synonyms with the particular term. For example, the first term is assigned a relevance score higher than the second term. The relevance score can also be based on the context of the particular term in the thesaurus. For example, the particular term "diamond" is in several contexts in a thesaurus, such as "gemstone," "field," "ice," "jewelry," and "stadium." The particular term can be grouped with synonyms for a particular context. For example, the particular term diamond in the context of field may be in the group "amphitheater, battlefield, circuit, course, court, diamond, fairground, golf course, green, etc." The relevance score can be based on proximity of the particular term to a synonym. The relevance score can also be based on the number of times a particular term and a synonym appear in different or same proximity in the contexts.

In one embodiment, configuration data 253 that is stored in the data store 250 is used to configure the terms sub-module 205 to use a relevance score based on a statistical co-occurrence algorithm or a relevance score based on a thesaurus. The configuration data 253 can be user-defined data.

The terms sub-module 205 can search the pre-processed data 251 using the input phrase and identify which terms are related to the input phrase. The UI manager 210 can present the related concept terms and a GUI element, which provides a graphical representation of the concept as defined by the input phrase, in the UI 203. Examples of a GUI element can include, and are not limited to, a shape, a text element, an icon, a symbol, and a picture. In one embodiment, the UI 203 includes a blank canvas where a GUI element representing the input phrase is in the center. The related concept terms can be presented as a list in the UI 203. The UI manager 210 can include a number of the related concept terms in the UI 203 based on a threshold stored in configuration data 253. The threshold can be a user-defined threshold. The threshold can be a number. For example, the UI manager 210 presents 20 concept terms. The threshold can be a minimum relevance score. In one embodiment, the UI manager 210 presents a relevance score in the UI 203 for each of the presented concept terms. Examples of the UI 203 are described in greater detail below in conjunction with FIGS. 4A-D and FIGS. 5A-B, according to some embodiments.

The UI manager 210 can receive user input via the UI 203 of a selection of one or more of the related concept terms and can present a visual representation of a relationship between the selected concept term(s) and the input phrase in the UI 203. The relationship can be a hierarchical relationship, such as a parent-child relationship.

The UI manager 210 can use the pre-processed data 251 to determine a number of documents in a data set that would be returned if a concept search is executed based on the input phrase and the currently selected concept terms. The pre-processed data 251 can include data identifying the documents associated with a concept term and a concept. For example, the UI manager 210 can identify that there are 750 documents in the data set that can be retrieved if a concept search based on the input phrase diamond and the terms earnings, profits, and expectations is executed. The UI manager 210 can present an indicator (e.g., a count, a bar) in the UI 203 indicating the number of documents that are available to be retrieved for the search. The UI manager 210 can continue to receive user input via the UI 203 of a selection of one or more of the related concept terms and can update the count of documents and the visual representation of a relationship between the currently selected concept term(s) and the input phrase in the UI 203.

The UI manager 210 can receive user input via the UI 203 to change the input phrase to one of the concept terms to allow a user to explore terms which are related to any other term. The terms sub-module 205 can search the pre-processed data 251 using the new input phrase and identify which terms are related to the new input phrase. The UI manager 210 can present new relevant concept terms (terms that are relevant to a term, which is relevant to the concept) in the UI 203. One embodiment to allow a user to explore terms which are related to any other term is described in greater detail below in conjunction with FIG. 5A.

The UI manager 210 can receive user input via the UI 203 to execute a search and retrieve the documents based on the input phrase(s) and the currently select concept terms. In one embodiment, the search that is executed is a concept search. In another embodiment, the search that is executed is a key word search using the input phrase and the currently select concept terms for the key word search query. One embodiment of executing a key word search is described in greater detail below in conjunction with FIG. 3.

The search sub-module 215 can execute the search and locate the documents in a collected data repository (e.g., collected data repository 120 in FIG. 1) and provide the documents to the user via a GUI (e.g., UI 203 or another GUI). For example, the search sub-module 215 can search the collected data 251 for the 750 documents in the data set that are related to the input phrase diamond and the terms earnings, profits, and expectations. The search sub-module 215 can store the search results 255 in the data store 250.

Figure 3:
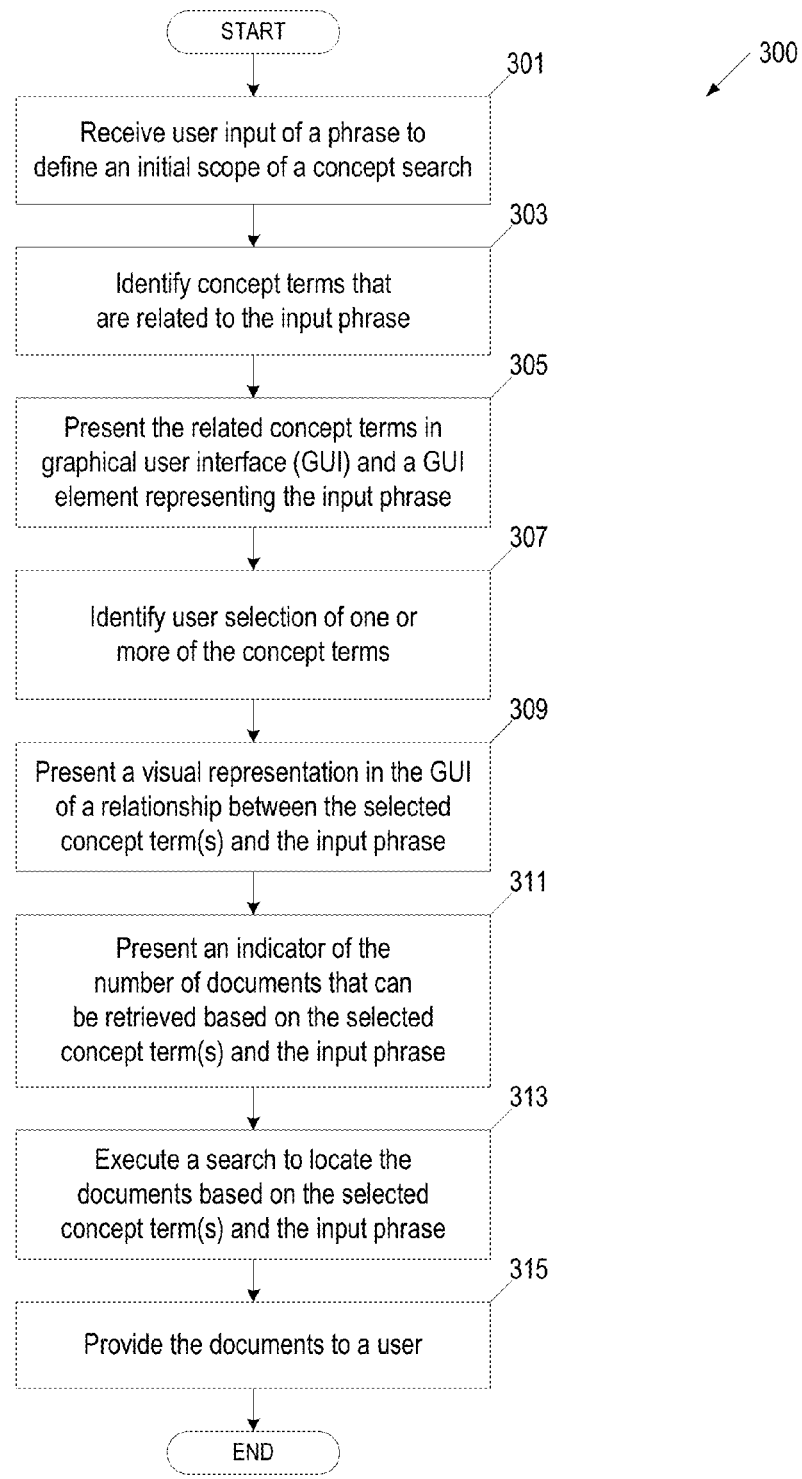
FIG. 3 is a flow diagram illustrating an embodiment for a method of providing a visual representation of a concept search.

FIG. 3 is a flow diagram of an embodiment of a method 300 for providing a visual representation of a concept search. The method 300 is performed by processing logic that may comprise hardware (circuitry, dedicated logic, etc.), software (such as is run on a general purpose computer system or a dedicated machine), or a combination of both. In one embodiment, the method 300 is performed by the server machine 115 of FIG. 1. The method 300 may be performed by a concept search user interface module 110 running on server machine 115 or another machine.

At block 301, processing logic receives user input via a GUI of a phrase to define an initial scope of a concept search of a data set. At block 303, processing logic identifies concept terms that are related to the input phrase based on documents in the data set. Processing logic can determine the concept terms that are related to the input phrase based on a relevance score assigned using a statistical co-occurrence algorithm and/or relevance score based on a thesaurus.

Figure 4A:
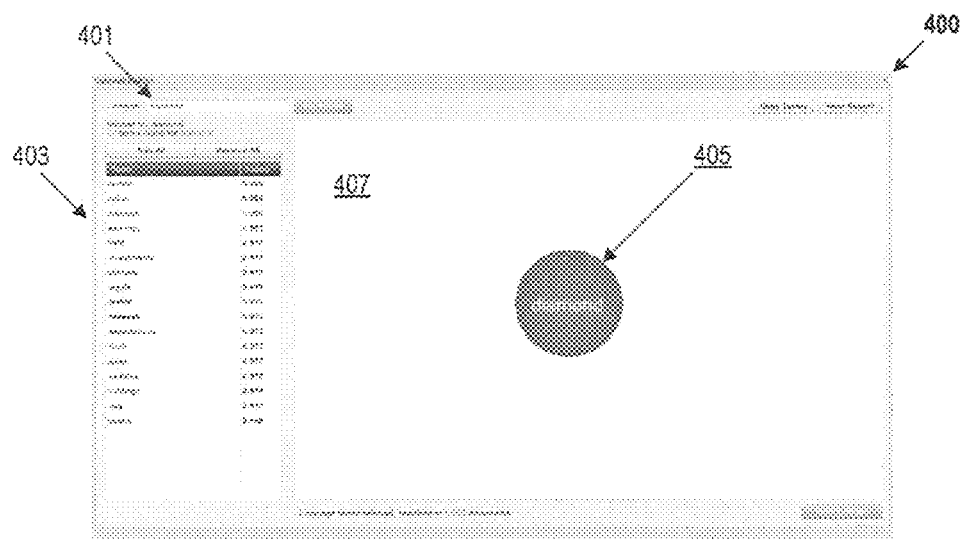
FIGS. 4A-D are exemplary graphical user interfaces (GUIs) presenting a visual relationship between an input phrase and related concept terms, according to some embodiments.

At block 305, processing logic presents the related concept terms and a GUI element to represent the input phrase in a GUI. In one example, processing logic presents a list of the concept terms having the top 20 relevance scores. FIG. 4A is an exemplary GUI 400 presenting the concept terms and the input phrase to define the scope of a search, according to one embodiment. GUI 400 can include an interactive GUI element 401 (e.g., a text box, a selection box, a drop down box, etc.) to receive input of a phrase to define an initial scope of a concept search. The GUI 400 includes a blank canvas 407 where a GUI element 405 representing the input phrase is in the canvas 407 (e.g., center of canvas 407) and a list 403 of the concept terms that are related to the input phrase. A user may select one or more of the related concept terms in the list 403 to refine the scope of the search.

Figure 4B:
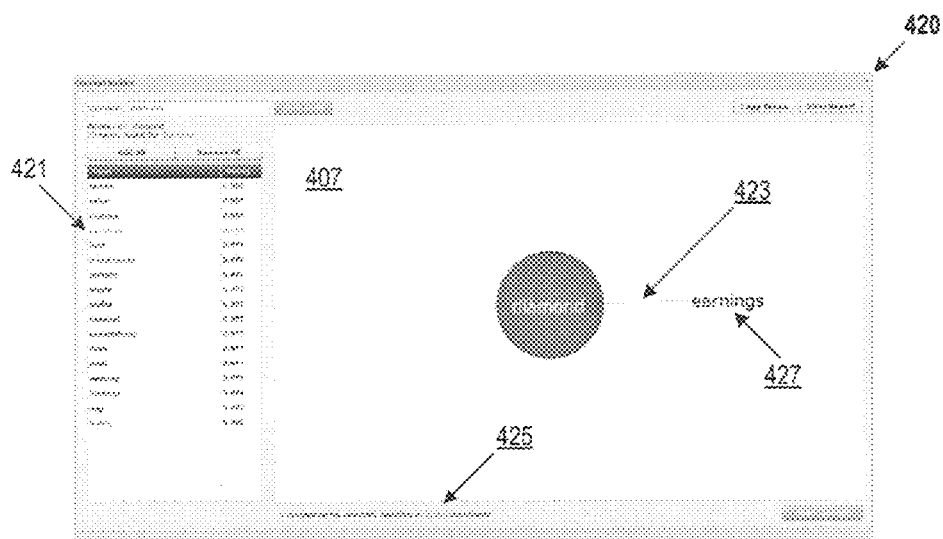

Returning to FIG. 3, at block 307, processing logic identifies user selection of one or more of the related concept terms and presents a visual representation of a relationship between the selected concept term(s) and the input phrase in the GUI at block 309. In one embodiment, processing logic presents an indicator (e.g., a count, a bar) in the GUI of the number of documents that are available to be retrieved for the search (e.g., concept search) at block 311. The indicator (e.g., count) is based on the relationship between the selected concept term(s) and the input phrase. FIG. 4B is an exemplary GUI 420 presenting a visual representation of a relationship between selected concept terms and the input phrase, according to one embodiment. GUI elements (e.g., text 427) can be presented in the canvas 407 to represent the selected terms. GUI elements (e.g., line 423) can be presented in the canvas 407 to represent a relationship between the selected terms and the input phrase. For example, a user selects the term earnings 421 and a text element 427 is added to the canvas 407 to represent the term earnings 421. A line element 423 is added to the canvas to represent a parent-child relationship between the term earnings 421 (e.g., child) and the input phrase diamond (e.g., parent). A count element 425 indicates that there are 1,100 documents in the data set that can be retrieved if a search based on the input phrase diamond and the term earnings 421 is executed.

Returning to FIG. 3, portions of method 300 may be recursive where a user makes a first selection of one or more concept terms (e.g., earnings) in the GUI and processing logic presents a visual representation of the relationship between the first selection of concept terms (e.g., earnings) and the input phrase (e.g., diamond) in the GUI. Processing logic also presents a count (e.g., 1,100) of the documents that can be retrieved based on the relationship between the first selection and the input phrase. A user may decide that the number of documents is too large and may make one or more further selections of additional and/or different concepts terms in the GUI to further refine the concept search. Processing logic updates the visual representation in the GUI to add the relationships between the newly selected concept terms and the input phrase and to update the count of the documents that can be retrieved based on the relationships between the newly selected concept terms selection and the input phrase. "Newly" selected concept terms can be cumulative to include previously selected concept terms.

Figure 4C:
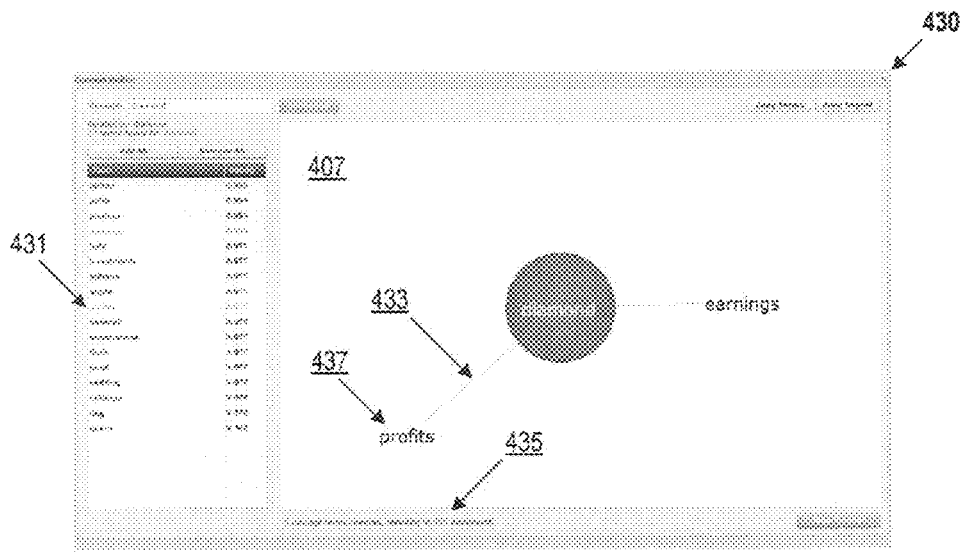
Figure 4D:
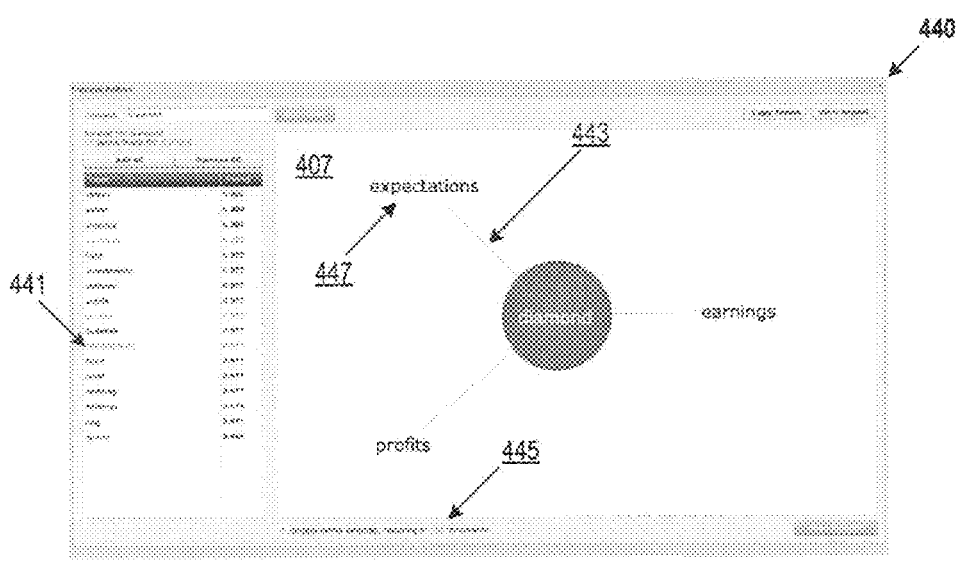

FIG. 4C and FIG. 4D are exemplary GUIs 430,440 presenting updated visual representations, according to one embodiment. For example, GUI 430 illustrates a next selection of the term profits 431 and the addition of a text element 437 to the canvas 407 to represent the term profits 431. A line element 433 is added to the canvas 407 to represent a parent-child relationship between the term profit 431 and the input phrase diamond. A count element 435 is updated to indicate that there are 900 documents in the data set that can be retrieved if a search based on the input phrase diamond and the terms earnings and profits is executed. In another example, GUI 440 illustrates a next selection of the term expectations 441 and the addition of a text element 447 to the canvas 407 to represent the term expectations 441. A line element 443 is added to the canvas 407 to represent a parent-child relationship between the term expectations 441 and the input phrase diamond. A count element 445 is updated to indicate that there are 750 documents in the data set that can be retrieved if a search based on the input phrase diamond and the terms earnings, profits, and expectations is executed.

In one embodiment, the GUI includes GUI elements to allow a user to zoom in, zoom out, pan, show child terms emerging from parent terms, drag and drop to move the terms around the GUI for convenience, delete terms, etc.

Figure 5A:
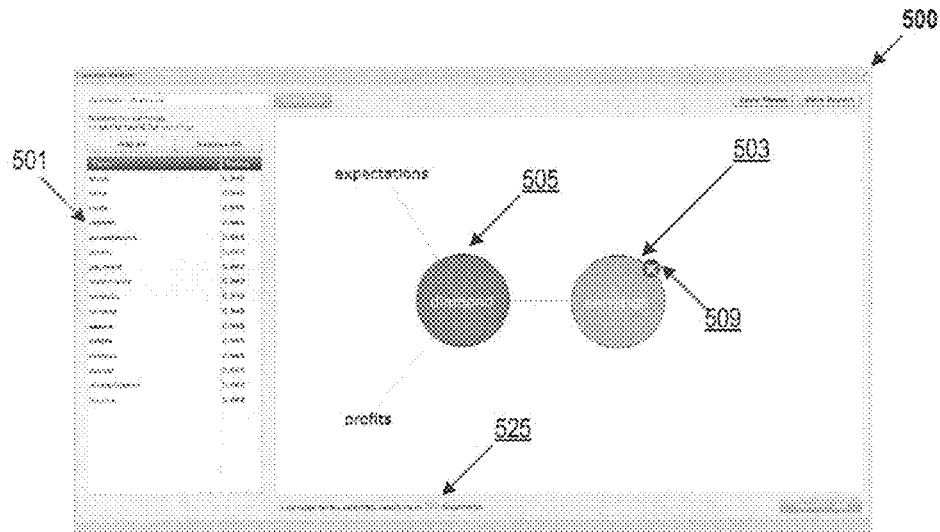
FIGS. 5A-B are exemplary GUIs presenting visual representations between a changed input phrase and related concept terms, according to some embodiments.

A user may wish to explore terms which are related to any other term in the GUI (e.g., list). In one embodiment, processing logic receives user input via the GUI to change the input phrase to one of the concept terms. The initial input phase then becomes one of the concept terms being related to the new input phrase. Processing logic can highlight a selected term on the canvas in the GUI, and present new relevant terms (terms that are relevant to a term, which is relevant to the concept) in the GUI. FIG. 5A is an exemplary GUI 500 presenting a change in an input phrase, according to one embodiment. For example, GUI 500 illustrates a selection of the term earnings as a new input phrase. For example, a user selects text element 449 corresponding to earning in the canvas 407 in FIG. 4D. Returning to FIG. 5A, the initial input phrase diamond 505 becomes a concept term that is related to the new input phrase earnings. The GUI element 503 of the new input phrase earning is updated to reflect the change. For example, the GUI element 503 can be a shape that is the same as the initial input phrase, but of a different color. In another embodiment, the GUI element 503 can be a GUI element that is different from the initial input phrase. In one embodiment, the GUI includes an indicator element 509 to indicate the current input.

Figure 5B:
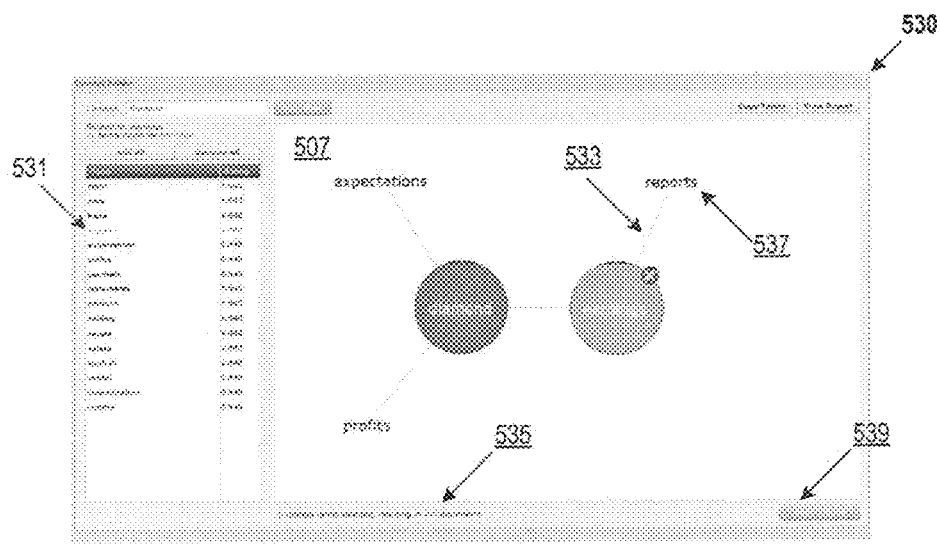

The list 501 of related concept terms is updated to reflect the new input phrase earnings 503 in relation to the initial input phrase. A user can select one or more of the related concept terms in the updated list 501 to further refine the scope of the search. FIG. 5B is an exemplary GUI 530 presenting a visual representation of a relationship between selected concept terms and the new input phrase, according to one embodiment. For example, a user selects the term reports 531 and a text element 537 is added to the canvas 507 to represent the selected term reports 531. A line element 533 is added to the canvas 507 to represent a parent-child relationship between the term reports 537 (e.g., child) and the new input phrase earnings (e.g., parent). A count element 535 is updated to indicate that there are 400 documents in the data set that can be retrieved if a search based on the new input phrase earnings, the initial input phrase diamond, and the terms profits, expectations, and reports is executed.

Returning to FIG. 3, at block 313, processing logic executes a search on the data set to locate the documents based on the selected concept term(s) and the input phrase(s) and provides the documents to a user at block 315. Processing logic can receive user input via the GUI indicating a search is to be executed. The GUI can include a GUI element (e.g., element 539 in FIG. 5B), which a user can select to trigger the execution of a search. In one embodiment, the search to be executed is a concept search based on the selected concept term(s) and input phrase. For example, a user has made a final selection of the concept term(s) and input phrase(s) and clicks a Save button in the GUI to execute the concept search. Processing logic can present a list of the documents from a result of executing the concept search in the GUI. In one embodiment, a user can click a document in the list to view the corresponding document.

In another embodiment, processing logic can execute a key word search using the selected concept term(s) and the input phrase(s). In another embodiment, processing logic can execute a concept search using user-specified search criteria in addition to the selected concept term(s) and the input phrase(s). Processing logic can receive user input via the GUI of search criteria to use to execute the concept search. Examples of search criteria can include, and are not limited to, date range, custodian, location of data, data type, languages, tags in folders, properties of a data item (e.g., email properties), etc.

Figure 6:
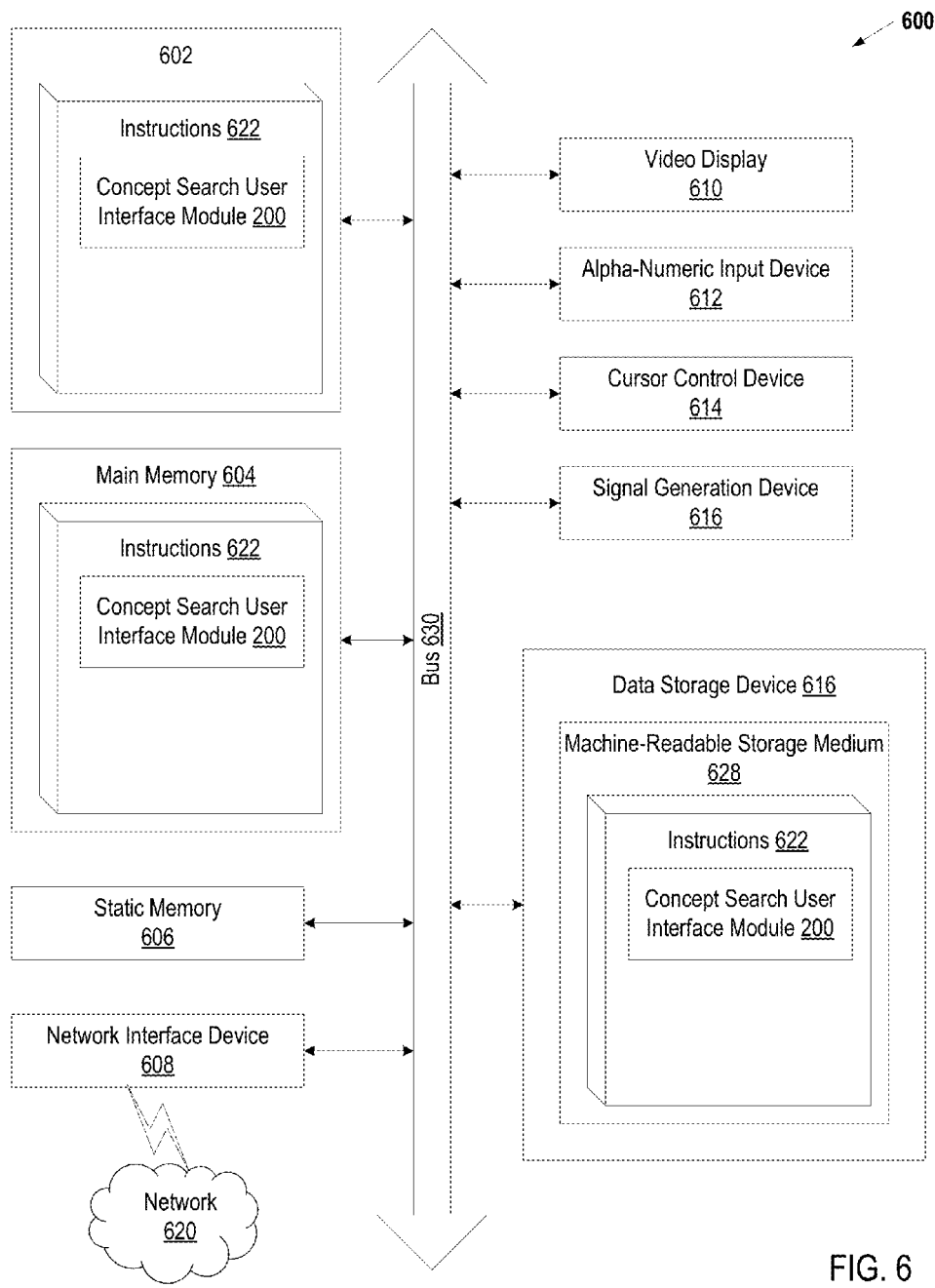
FIG. 6 is a block diagram of an exemplary computer system that may perform one or more of the operations described herein.

FIG. 6 illustrates a diagram of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., software) embodying any one or more of the methodologies or functions described herein.

The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one embodiment, the instructions 622 include instructions for a concept search user interface module (e.g., concept search user interface module 200 of FIG. 2) and/or a software library containing methods that call a concept search user interface module. While the computer-readable storage medium 628 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "presenting", "updating", "determining", "executing," "providing," "receiving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, from an input device, an input phrase defining an initial scope of a concept search;
   identifying, by a processing device, a plurality of concept terms related to the input phrase in view of an analysis of documents in a data set;
   determining, by the processing device, a relevance score for each of the plurality of concept terms;
   determining, by the processing device, a set of concept terms from the plurality of concept terms that have a relevance score that exceeds a threshold value;
   displaying the set of concept terms at a first section of a graphical user interface (GUI);
   displaying the input phrase at a second section of the GUI;
   receiving, from the input device, a selection of a concept term from the set of concept terms;
   displaying, in the second section of the GUI, a visual representation of a relationship between the selected concept term and the input phrase in response to the selection of the concept term;
   identifying, by the processing device, one or more of the documents related to the selection of the concept term and the input phrase;
   displaying, in a third section of the GUI, a count of the one or more documents related to the selection of the concept term and the input phrase;
   receiving, from the input device, a selection of an additional concept term from the set of concept terms;
   identifying, by the processing device, one or more of the documents related to the selected concept term, the input phrase, and the additional concept term;
   updating the visual representation to indicate a relationship between the selected concept term, the additional concept term, and the input phrase; and
   displaying the one or more documents to a user.

2. The method of claim 1, wherein the relationship between the selected concept term and the input phrase is a parent-child relationship.

3. The method of claim 1, wherein identifying the plurality of concept terms related to an input phrase comprises determining the plurality of concept terms using at least one of a statistical co-occurrence algorithm or a thesaurus.

4. The method of claim 1, further comprising:
   executing a search of the data set to locate the one or more documents based on the selection of the concept term and the input phrase.

5. The method of claim 1, further comprising displaying, at the first section of the GUI, the relevance score for each of the concept terms in the set of concept terms, the relevance score indicating a degree of relevance of the corresponding concept term to the input phrase.

6. The method of claim 1, further comprising executing a key word search of the data set based on the input phrase and the selection of the concept term.

7. The method of claim 1, further comprising:
receiving an input for search criteria, the search criteria comprising at least one of a date range, custodian, location of data, data type, language, tag in folder, or property; and
executing a search of the data set to locate the one or more documents based on the search criteria, the input phrase, and the selection of the concept term.

8. A system comprising:
a memory; and
a processing device coupled with the memory to:
receive, from an input device, an input phrase defining an initial scope of a concept search;
identify a plurality of concept terms related to the input phrase in view of an analysis of documents in a data set;
determine a relevance score for each of the plurality of concept terms;
determine a set of concept terms from the plurality of concept terms that have a relevance score that exceeds a threshold value;
display the set of concept terms at a first section of a graphical user interface (GUI);
display the input phrase at a second section of the GUI;
receive, from the input device, a selection of a concept term from the set of concept terms;
display in the second section of the GUI, a visual representation of a relationship between the selected concept term and the input phrase in response to the selection of the concept term;
identify one or more of the documents related to the selection of the concept term and the input phrase;
display, in a third section of the GUI, a count of the one or more documents related to the selected concept term and the input phrase;
receive, from the input device, a selection of an additional concept term from the set of concept terms;
identify one or more of the documents related to the selected concept term, the input phrase, and the additional concept term;
update the visual representation to indicate a relationship between the selected concept term, the additional concept term, and the input phrase; and
display the one or more documents to a user.

9. The system of claim 8, wherein to identify a plurality of concept terms related to the input phrase the processing device is further to determine the plurality of concept terms using at least one of a statistical co-occurrence algorithm or a thesaurus.

10. The system of claim 8, wherein the processing device is further to:
execute a search of the data set to locate the one or more documents based on the selection of the concept term and the input phrase.

11. The system of claim 8, wherein the processing device is further to execute a key word search of the data set based on the input phrase and the selection of the concept term.

12. The system of claim 8, wherein the processing device is further to:
receive an input for search criteria, the search criteria comprising at least one of a date range, custodian, location of data, data type, language, tag in folder, or property; and
execute a search of the data set to locate the one or more documents based on the search criteria, the input phrase, and the selection of the concept term.

13. A non-transitory computer readable storage medium including instructions that, when executed by a processing device, cause the processing device to perform operations comprising:
receiving, from an input device, an input phrase defining an initial scope of a concept search;
identifying a plurality of concept terms related to the input phrase in view of an analysis of documents in a data set;
determining a relevance score for each of the plurality of concept terms;
determining a set of concept terms from the plurality of concept terms that have a relevance score that exceeds a threshold value;
displaying the set of concept terms at a first section of a graphical user interface (GUI);
displaying the input phrase at a second section of the GUI;
receiving, from the input device, a selection of a concept term from the set of concept terms;
displaying, in the second section of the GUI, a visual representation of a relationship between the selected concept term and the input phrase in response to the selection of the concept term;
identifying one or more of the documents related to the selection of the concept term and the input phrase;
displaying, in a third section of the GUI, a count of the one or more documents related to the selected concept term and the input phrase;
receiving, from the input device, a selection of an additional concept term from the set of concept terms;
identifying, by the processing device, one or more of the documents related to the selected concept term, the input phrase, and the additional concept term;
updating the visual representation to indicate a relationship between the selected concept term, the additional concept term, and the input phrase; and
displaying the one or more documents to a user.

14. The non-transitory computer readable storage medium of claim 13, wherein identifying a plurality of concept terms related to the input phrase comprises determining the plurality of concept terms using at least one of a statistical co-occurrence algorithm or a thesaurus.

15. The non-transitory computer readable storage medium of claim 13, the operations further comprising:
executing a search of the data set to locate the one or more documents based the selection of the concept term and the input phrase.

16. The non-transitory computer readable storage medium of claim 13, the operations further comprising executing a key word search of the data set based on the input phrase and the selection of the concept term.

17. The non-transitory computer readable storage medium of claim 13, the operations further comprising:
receiving an input for search criteria, the search criteria comprising at least one of a date range, custodian, location of data, data type, language, tag in folder, or property; and
executing a search of the data set to locate the one or more documents based on the search criteria, the input phrase, and the selection of the concept term.

* * * * *